US006839007B2

United States Patent
Zhao et al.

(10) Patent No.: US 6,839,007 B2
(45) Date of Patent: Jan. 4, 2005

(54) INNER CODING OF HIGHER PRIORITY DATA WITHIN A DIGITAL MESSAGE

(75) Inventors: Lijun Zhao, San Diego, CA (US); Lorenzo Casaccia, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/238,951

(22) Filed: Sep. 9, 2002

(65) Prior Publication Data

US 2003/0101404 A1 May 29, 2003

Related U.S. Application Data

(60) Provisional application No. 60/335,492, filed on Nov. 1, 2001.

(51) Int. Cl.[7] .............................................. H03M 13/00
(52) U.S. Cl. ........................................ 341/94; 714/756
(58) Field of Search ........................... 341/94; 714/748, 714/755, 756, 757

(56) References Cited

U.S. PATENT DOCUMENTS

| | | | |
|---|---|---|---|
| 5,606,569 A | | 2/1997 | MacDonald et al. |
| 5,867,530 A | * | 2/1999 | Jenkin ........................ 375/259 |
| 6,212,659 B1 | | 4/2001 | Zehavi |

FOREIGN PATENT DOCUMENTS

| | | |
|---|---|---|
| EP | 0317197 A2 | 5/1989 |
| WO | 01/52467 A1 | 7/2001 |

OTHER PUBLICATIONS

Dale C. Linne von Berg et al. "Improved Concatenated Coding/Decoding for Deep Space Prob s," Department of Electrical Engineering, University of Virginia. Communication for Global Users, IEEE, vol. 1, Dec. 6, 1992, pp. 707–711.

* cited by examiner

*Primary Examiner*—Howard L Williams
(74) *Attorney, Agent, or Firm*—Philip R. Wadsworth; Thien T. Nguyen; Sandra L. Godsey

(57) ABSTRACT

Techniques for reliable transmission of higher priority data within a frame are disclosed. In one aspect, an inner code is applied to one or more partial segments of a transmitted data frame in addition to any outer code applied to the entire frame. In another aspect, inner coded segments of a received frame are decoded when decoding of the outer code indicates one or more errors within the frame. The inner coded segment is retained when the inner decoding decodes without error. Various other aspects are also disclosed. These aspects have the benefits of reducing the number of retransmissions of higher priority data, as well as reducing delay for time-sensitive segments of the frame. The result is more efficient use of bandwidth, more responsiveness to higher priority segments, such as signaling traffic, and capacity, power, and other efficiencies associated therewith.

42 Claims, 8 Drawing Sheets

INNER CODING OF HIGHER PRIORITY DATA WITHIN A DIGITAL MESSAGE

CLAIM OF PRIORITY UNDER 35 U.S.C. §119

The present Application for Patent claims priority to Provisional Application No. 60/335,492 entitled "METHOD AND APPARATUS FOR IMPROVED DIM AND BURST MESSAGING" filed Nov. 1, 2001, and assigned to the assignee hereof and hereby expressly incorporated by reference herein.

BACKGROUND

1. Field

The present invention relates generally to wireless communication, and more specifically to improved communication of higher priority information within a digital message.

2. Background

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), (4) the "TIA/EIA-IS-856 CDMA2000 High Rate Packet Data Air Interface Specification" (the IS-856 standard), and (5) some other standards. Non-CDMA systems include AMPS, GSM, and other TDMA systems. These and other wireless communication standards support voice and/or data communication at various data rates.

In the field of digital communications, various message formats are used for transmitting combinations of different types of data. In existing code division multiple access (CDMA) systems, for example, blocks of data, also known as "traffic," are arranged into data frames containing various combinations of primary traffic, secondary traffic, and signaling traffic. Data frames containing either primary traffic and secondary traffic or primary traffic and signaling traffic are called "dim and burst" frames. Data frames containing either exclusively secondary traffic or exclusively signaling traffic are referred to as "blank and burst" frames. An exemplary set of frame formats for transmitting various combinations of dim and burst or blank and burst frames can be obtained from "TIA/EIA/IS-2000.3-A-1 Medium Access Control (MAC) Standard for cdma2000 Spread Spectrum Systems, Addendum 1," hereinafter referred to as "1x."

Each data frame is transmitted through a wireless channel between a base station and a remote station. Noise in the wireless channel can cause some transmitted frames to be received with bit errors. Such bit errors can then preclude proper decoding of the data frames at the receiver and cause loss of entire data frames. For some types of data, such as voice data, the loss of a frame does not require retransmission of the data in the frame. For other types of data, signaling data, for example, the loss of a frame containing such data requires retransmission of the data in a subsequent frame. Such retransmissions consume bandwidth that would be otherwise available for transmission of additional user data. Such retransmissions also cause delay in the ultimate reception of the retransmitted data, which can be detrimental when timeliness of signaling data affects the quality of the communication channel.

Thus, certain segments of a frame may be higher priority than other segments. However, an error in a lower priority section may require retransmission of the entire frame, even though the higher priority information was received correctly. There is therefore a need in the art for reliable transmission of higher priority data within a frame to reduce the delay and loss of bandwidth associated with errors in the frame.

SUMMARY

Embodiments disclosed herein address the need for reliable transmission of higher priority data within a frame. In one aspect, an inner code is applied to one or more partial segments of a transmitted data frame in addition to any outer code applied to the entire frame. In another aspect, inner coded segments of a received frame are decoded when decoding of the outer code indicates one or more errors within the frame. The inner coded segment is retained when the inner decoding decodes without error. Various other aspects are also disclosed. These aspects have the benefits of reducing the number of retransmissions of higher priority data, as well as reducing delay for time-sensitive segments of the frame. The result is more efficient use of bandwidth, more responsiveness to higher priority segments, such as signaling traffic, and capacity, power, and other efficiencies associated therewith.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
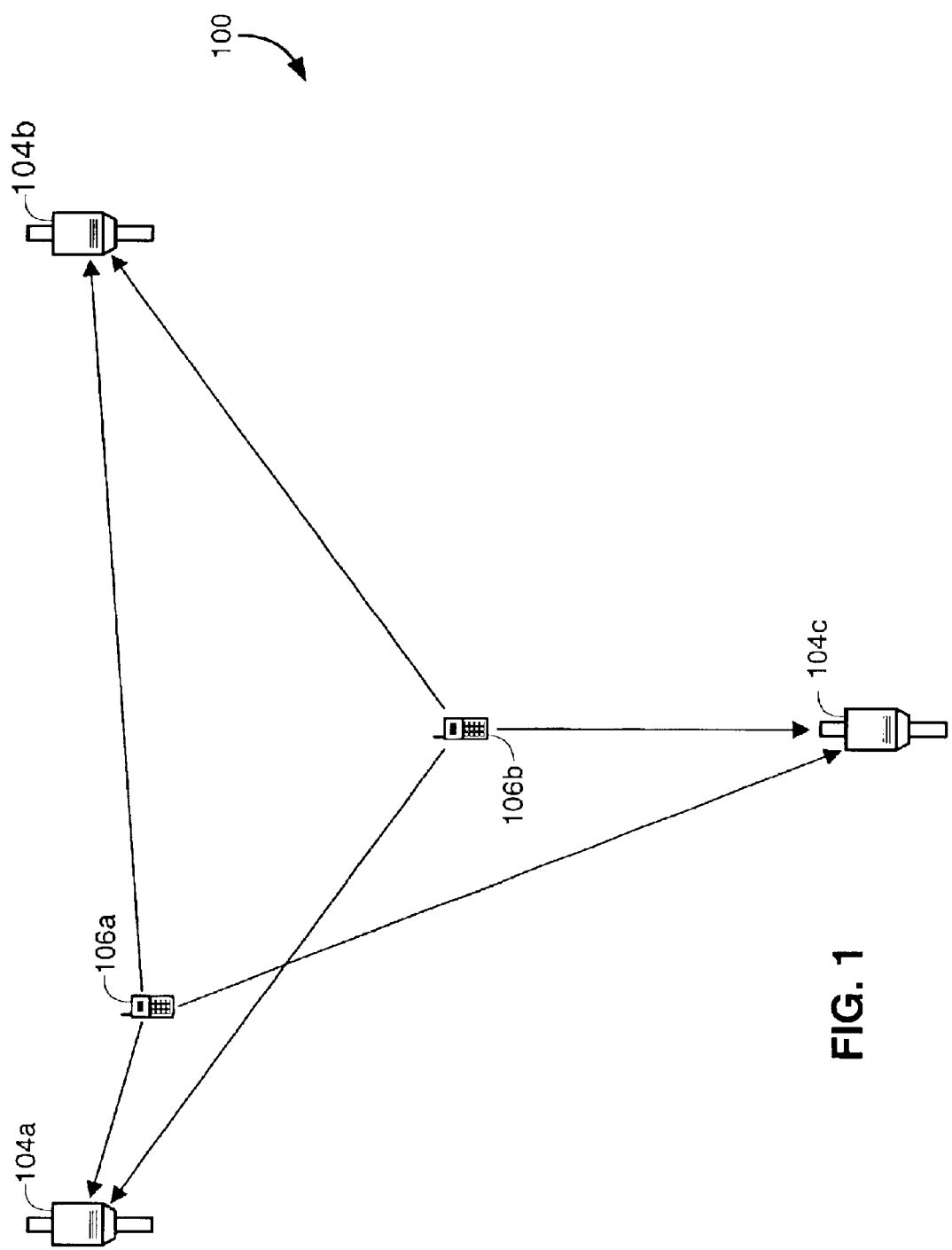
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
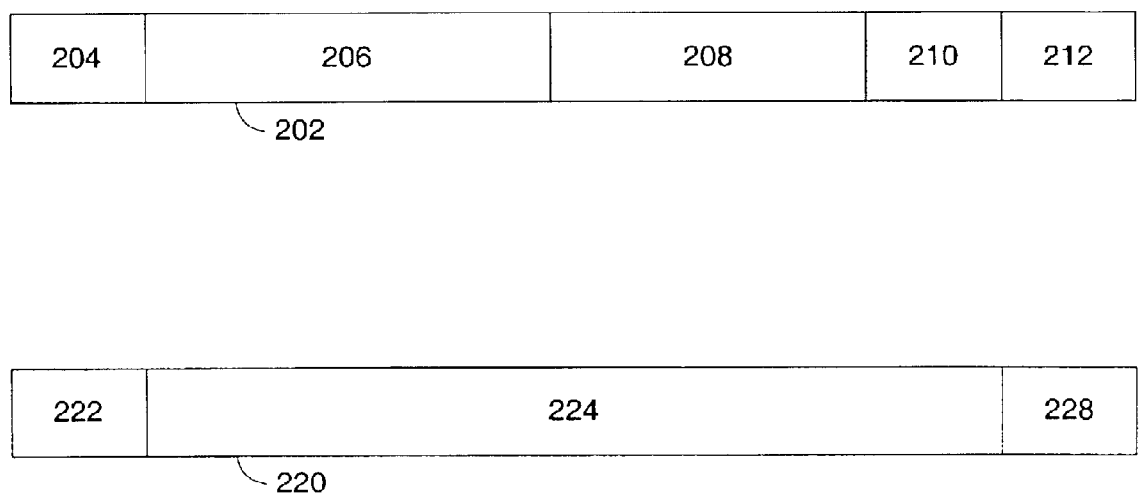
FIG. 2 shows exemplary frame structures using both inner and outer codes to detect bit errors within a frame.

FIG. 2 shows exemplary frame structures using both inner and outer codes to detect bit errors within a frame. Frame format 202 is an exemplary dim and burst format containing a primary traffic segment 206 and a signaling traffic segment 208. Frame 220 is an exemplary blank and burst format, containing a signaling traffic segment 224, but no primary or secondary traffic segment. Tables 1 and 2 contain exemplary frame formats, taken from the 1× publication. Table 1, entitled "Type 1 Frame Formats," shows proposed frame formats for a channel having a maximum data rate of 9600 bits per second. Table 2, entitled "Type 2 Frame Formats," shows proposed frame formats for a channel having a maximum data rate of 14400 bits per second.

TABLE 1

Type 1 Frame Formats

| Transmit Rate (bits/sec) | Category | MuxPDU Header MM | MuxPDU Header TT | MuxPDU Header TM | Primary Traffic Bits | Signaling Traffic Bits | Secondary Traffic Bits |
|---|---|---|---|---|---|---|---|
| 9600 | 1 | '0' | — | — | 171 | 0 | 0 |
| | 2 | '1' | '0' | '00' | 80 | 88 | 0 |
| | 3 | '1' | '0' | '01' | 40 | 128 | 0 |
| | 4 | '1' | '0' | '10' | 16 | 152 | 0 |
| | 5 | '1' | '0' | '11' | 0 | 168 | 0 |
| | 11 | '1' | '1' | '00' | 80 | 0 | 88 |
| | 12 | '1' | '1' | '01' | 40 | 0 | 128 |
| | 13 | '1' | '1' | '10' | 16 | 0 | 152 |
| | 14 | '1' | '1' | '11' | 0 | 0 | 168 |

TABLE 2

Type 2 Frame Formats

| Transmit Rate (bits/sec) | Category | MuxPDU Header MM | MuxPDU Header FM | Primary Traffic Bits | Signaling Traffic Bits | Secondary Traffic Bits |
|---|---|---|---|---|---|---|
| 14400 | 1 | '0' | — | 266 | 0 | 0 |
| | 2 | '1' | '0000' | 124 | 138 | 0 |
| | 3 | '1' | '0001' | 54 | 208 | 0 |
| | 4 | '1' | '0010' | 20 | 242 | 0 |
| | 5 | '1' | '0011' | 0 | 262 | 0 |
| | 6 | '1' | '0100' | 124 | 0 | 138 |
| | 7 | '1' | '0101' | 54 | 0 | 208 |
| | 8 | '1' | '0110' | 20 | 0 | 242 |
| | 9 | '1' | '0111' | 0 | 0 | 262 |
| | 10 | '1' | '1000' | 20 | 222 | 20 |
| 7200 | 11 | '0' | — | 124 | 0 | 0 |
| | 12 | '1' | '000' | 54 | 67 | 0 |
| | 13 | '1' | '001' | 20 | 101 | 0 |
| | 14 | '1' | '010' | 0 | 121 | 0 |
| | 15 | '1' | '011' | 54 | 0 | 67 |
| | 16 | '1' | '100' | 20 | 0 | 101 |
| | 17 | '1' | '101' | 0 | 0 | 121 |
| | 18 | '1' | '110' | 20 | 81 | 20 |
| 3600 | 19 | '0' | — | 54 | 0 | 0 |
| | 20 | '1' | '00' | 20 | 32 | 0 |
| | 21 | '1' | '01' | 0 | 52 | 0 |
| | 22 | '1' | '10' | 20 | 0 | 32 |
| | 23 | '1' | '11' | 0 | 0 | 52 |
| 1800 | 24 | '0' | — | 20 | 0 | 0 |
| | 25 | '1' | — | 0 | 0 | 20 |

In Table 1, the supported transmit rate is 9600 bits per second. There are 9 categories, assigned the index values of 1–5 and 11–14. A Multiplexed Protocol Data Unit (Mux PDU) header is made up of the Mixed Mode (MM) bit, the Traffic Type (TT) bit and the Traffic Mode (TM) bits. Each category contains a unique MuxPDU header, which corresponds to a number of primary traffic bits, signaling traffic bits, and secondary traffic bits. Not all types of traffic are supported in each category, as indicated by a value of 0 in the table. In Table 2, the supported transmit rates (in bits per second) are 14400, 7200, 3600, and 1800. There are 25 categories, assigned index values 1–25, respectively. Type 2 MuxPDU headers contain a Mixed Mode (MM) bit and a variable number of Frame Mode (FM) bits. As in Table 1, each category contains a number of primary, signaling, and secondary traffic bits, which may be set to 0 in some of the categories. These tables are examples only. Those of skill in the art will recognize that myriad frame formats and combinations thereof can be deployed and fall within the scope of the present invention.

Frame 202 begins with a frame header 204. The frame header 204 may contain a combination of mixed mode bits and frame mode bits. For example, the frame header 204 may contain a single mixed mode bit. If the mixed mode bit has a value of '0', then the frame contains only primary traffic. If the mixed mode bit has a value of '1', then the frame contains some other combination of primary, secondary, and signaling traffic (e.g. signaling only, primary and signaling, or primary and secondary). Other combinations of traffic types may also be supported. Where the mixed mode bit indicates that the frame contains a combination other than exclusively primary traffic, the apportionment of bits in the frame to the various types of traffic are indicated in frame mode bits within the frame header. In an exemplary embodiment, the frame mode bits are only present within the frame header where the mixed mode bit has a value of '1'. Thus, the frame header may vary in length depending on the value of the mixed mode bit. In the frame format 202 shown, the frame header 204 indicates the types of data segments contained within the frame 202 and the sizes of those data segments.

In frame format 202, an inner code 210 is computed over the signaling traffic segment 208. In frame format 202, an outer code 212 is computed over the entire frame, including the frame header 204, the primary traffic segment 206, the signaling traffic segment 208, and the inner code 210. The outer code 212 may be an error detection code or an error correction code. In an exemplary embodiment, the outer code 212 is a cyclical redundancy checksum (CRC) code that allows detection of at least one bit error within the frame. In an exemplary embodiment, the inner code 210 is a CRC that allows detection of at least one bit error within the signaling traffic segment 208. Therefore, even after one or more bit errors occur within portions of the frame 202 other than the signaling traffic segment 208 and the inner code 210, the intact signaling traffic segment 208 can be extracted from the frame and used. In an alternate embodiment, the inner code 210 is an error correction code capable of correcting one bit received in error. In an alternate embodiment, the inner code 210 is computed over one or more bits within the frame header 204 in addition to the signaling traffic segment 208. Table 3 is an example of possible encoding parameters for various frame formats shown in Tables 1 and 2. It shows the number of inner code bits and outer code bits for a variety of the Type 1 and Type 2 frame formats. Table 3 is exemplary only, as one of skill in the art could readily apply any number of inner or outer code bits to one or more frames in myriad combinations.

TABLE 3

Code Sizes

| Category | Frame Bits | Primary + Secondary Bits | Signaling Bits | Inner Code Bits | Outer Code Bits |
|---|---|---|---|---|---|
| Type 1 | | | | | |
| 2 | 168 | 80 | 81 | 7 | 12 |
| 3 | 168 | 40 | 121 | 7 | 12 |
| 4 | 168 | 16 | 144 | 8 | 12 |
| 5 | 168 | 0 | 160 | 8 | 12 |
| Type 2 | | | | | |
| 2 | 262 | 124 | 130 | 8 | 12 |
| 3 | 262 | 54 | 200 | 8 | 12 |
| 4 | 262 | 20 | 234 | 8 | 12 |
| 5 | 262 | 0 | 254 | 8 | 12 |

TABLE 3-continued

Code Sizes

| Category | Frame Bits | Primary + Secondary Bits | Signaling Bits | Inner Code Bits | Outer Code Bits |
|---|---|---|---|---|---|
| 10 | 262 | 40 | 214 | 8 | 12 |
| 12 | 120 | 54 | 60 | 6 | 12 |
| 13 | 121 | 20 | 94 | 7 | 12 |
| 18 | 121 | 40 | 74 | 7 | 12 |
| 20 | 52 | 20 | 27 | 5 | 12 |

Frame format 220 is an exemplary blank and burst format containing a signaling traffic segment 224, but no primary traffic segment. In an exemplary embodiment, frame format 220 includes a frame header 222 that is similar to frame header 204. Frame header 222 identifies the frame format 220 as a blank and burst frame containing only a signaling traffic segment 224. Outer code 228 is computed over the entire frame, including the frame header 222 and the signaling traffic segment 224. The outer code 228 may be any of the same types of code as described for outer code 212. It is possible to cover the signaling section with an inner code as well, similar to frame 202 (details not shown). In the exemplary embodiment, however, no inner code is used in a blank and burst frame since the entire frame is signaling data. If additional protection is desired, the outer code can be strengthened. In an alternate embodiment, if certain signaling information is higher priority than other signaling information in a blank and burst frame, the frame can be segmented in similar fashion as frame 202. Those of skill in the art will be able to adapt the principles disclosed herein to any combination of frames, frame types, segmentation, and so forth.

Figure 3:
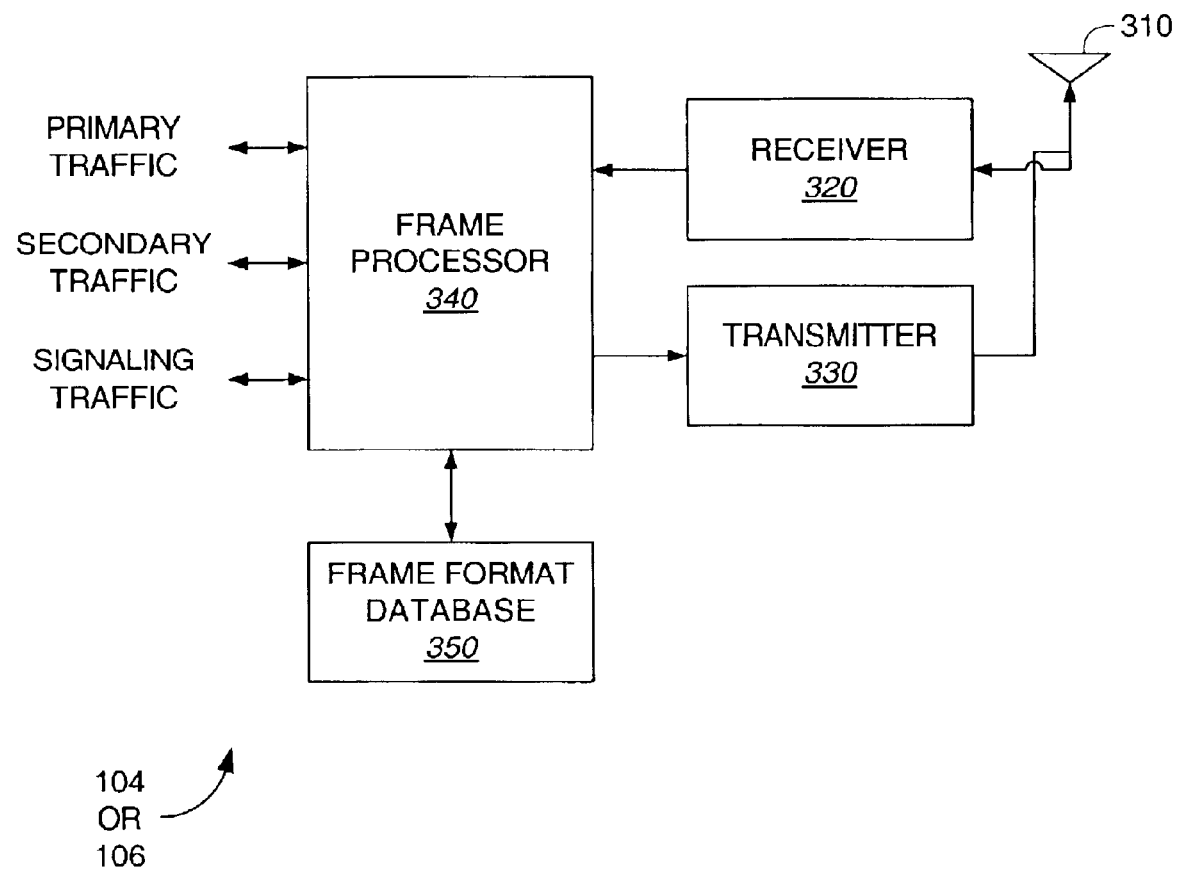
FIG. 3 depicts a portion of an exemplary wireless communication device, such as a base or mobile station.

FIG. 3 depicts a portion of an exemplary wireless communication device, such as a base station 104 or mobile station 106. The principles disclosed herein can be carried out on the forward link, on the reverse link, or both. The same error protection does not need to be provided in both directions, but it can be if so desired. Signals are received and transmitted via antenna 310. Transmitted signals are formatted in transmitter 330 according to one or more wireless system standards, such as those listed above, deployed in system 100. Examples of components that may be included in transmitter 330 are encoders, interleavers, spreaders, modulators of various types, amplifiers, filters, digital-to-analog (D/A) converters, radio frequency (RF) converters, and the like. Data for transmission is provided to transmitter 330 by frame processor 340.

Signals received at antenna 310 are processed in receiver 320 according to one or more wireless system standards, such as those listed above, deployed in system 100. Examples of components that may be deployed in receiver 320 include RF downconverters, amplifiers, filters, analog-to-digital (A/D) converters, demodulators, RAKE receivers, combiners, deinterleavers, decoders (Viterbi, turbo, block decoders such as BCH, etc.), and others. Data from receiver 320 is delivered to frame processor 340.

Frame processor 340 receives primary, secondary, and signaling traffic and formats it into frames for delivery to transmitter 330. Similarly, data received by receiver 320 is delivered to frame processor 340 where the data, frame by frame, are parsed and sent out as primary, secondary, or signaling traffic. Forming or parsing frames of data in frame processor 340 can be done in conjunction with frame format database 350, which holds the various parameters for various supported frame types, examples of which are listed in Tables 1–3 above.

In certain circumstances, primary, secondary, or signaling traffic may be an erasure if part or all of the frame is received in error. Some classes of data allow for lossy transmission, voice or video systems, for example, and do not necessarily require re-transmission if a frame is erased. Other types of data systems, or signaling information, may be sensitive to erasures and therefore a retransmission should occur when those frames or portions of frames are received in error. This will be detailed further below.

Frame processor 340 may be a Digital Signal Processor (DSP) or any general-purpose processor. Those of skill in the art will recognize that the methods and functions described herein with respect to frame processor 340 can also be performed using special purpose hardware, co-processors, a combination of processors or DSPs, or a combination of all of the above. Some or all of the functions attributed to various other blocks described may also be carried out in frame processor 340. Frame processor 340 will commonly contain, or be connected with, one or more memory elements, of which frame format database 350 may comprise or be a part for data storage as well as for storing instructions to carry out the various tasks and processes described herein.

Some or all of the functions of receiver 320 and transmitter 330, as well as other wireless communication device processes not described herein may also be carried out in frame processor 340. Techniques for receiving and transmitting signals in wireless communication systems, including CDMA systems and others are known in the art and fall within the scope of the present invention. Those of skill in the art will recognize myriad combinations of processors, special purpose hardware, etc., that can be deployed without deviating from the principles of the invention disclosed herein.

In addition to other functions not shown, a wireless communication device may also include a message generator and or a message decoder for generating or receiving signals and control messages, respectively. These may be incorporated in a processor such as frame processor 340, or another such processor, or any of the various other techniques readily available in the art. These details are not shown.

Figure 4:
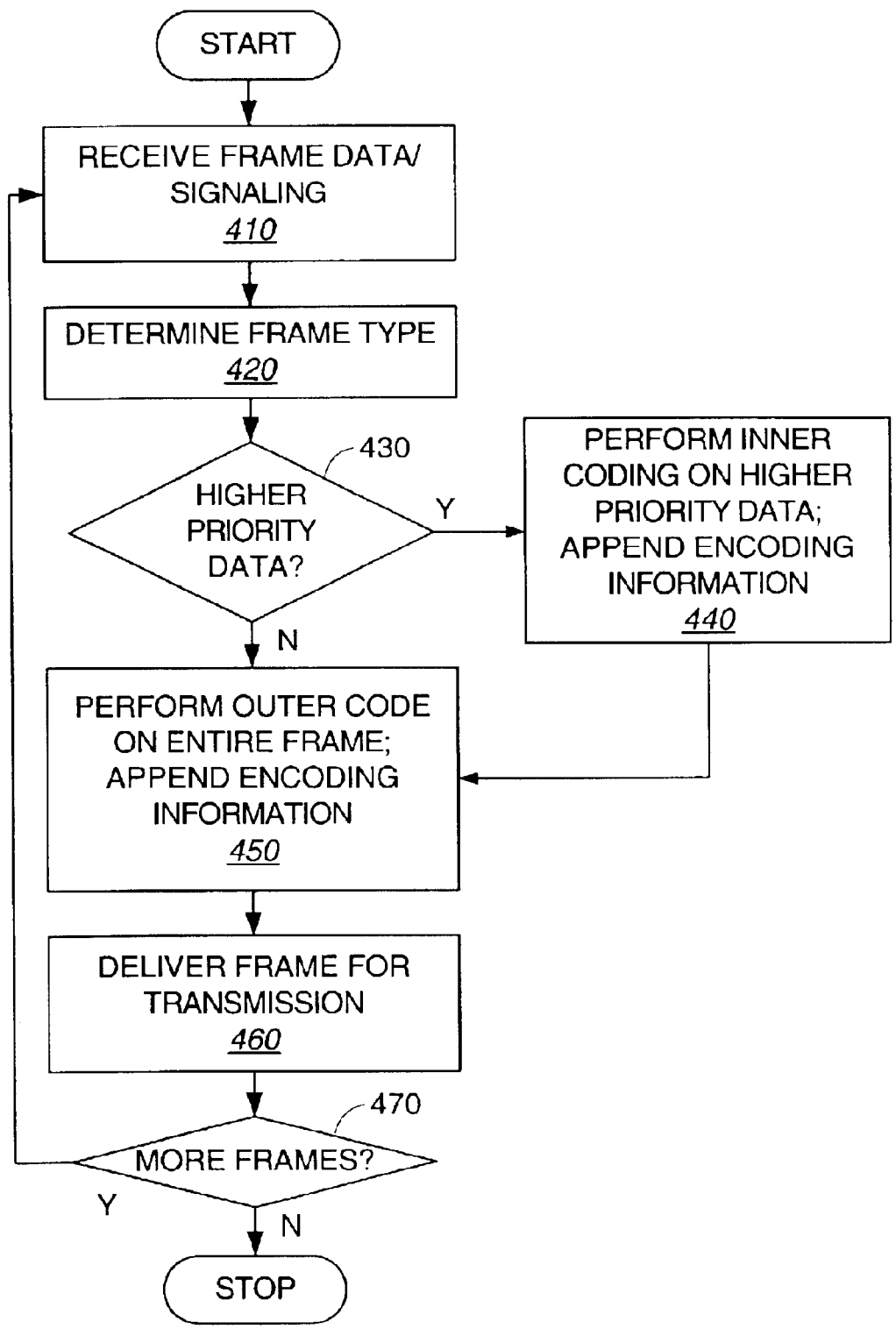
FIG. 4 depicts a flowchart of an embodiment of a method of preparing frames for transmission using inner coding.

FIG. 4 depicts an embodiment of a method of preparing frames for transmission using inner coding. The process starts in block 410, where data and/or signaling is received for framing. Data may comprise primary traffic, secondary traffic, signaling traffic, or a combination of any of them. According to the type of data and the number of bits for transmission, among other parameters, a frame type is determined in block 420. This determination can be made in accordance with a table of frame formats stored in a frame format database 350. Proceed to decision block 430.

In decision block 430, if the frame comprises higher priority data, proceed to block 440. In block 440, coding is performed on the higher priority data. Various encoding schemes with varying levels of protection and processing requirements are known in the art. The encoding may include error detection codes or error correction codes. Examples include cyclic redundancy check (CRC) codes, BCH codes (including Reed-Solomon Codes), any other block or convolutional codes, etc. In an exemplary embodiment, an error detection code can be a CRC with a generator polynomial such as $g(x)=x^8+x^7+x^4+x^3+x+1$ for an 8-bit CRC, or $g(x)=x^6+x^2+x+1$ for a 6-bit CRC. In many embodiments that can support a more complex code, a carefully chosen error correction code may be deployed. The encoding information, or inner code, is appended to the priority information within the frame. Those of skill in the art will recognize that various orders and relative position of bits within a frame can be contemplated, including the priority information and the inner code, and fall within the scope of the present invention. Proceed to block 450.

If, in decision block 430, there was no higher priority data, also proceed to block 450. In block 450, encoding is performed on the entire frame to produce the outer code. As with the inner code, various encoding schemes are well known in the art, and these, along with encoding techniques yet to be developed can be deployed in embodiments described herein, and fall within the scope of the present invention. The encoding techniques used for the inner and outer code can be, but need not be, the same. An exemplary outer code may be a CRC code with a generator polynomial such as $g(x)=x^{12}+x^{11}+x^{10}+x^9+x^8+x^4+x+1$ for a 12-bit CRC, $g(x)=x^{10}+x^9+x^8+x^7+x^6+x^4+x^3+1$ for a 10-bit CRC, or $g(x)=x^8+x^7+x^4+x^3+x+1$ for an 8-bit CRC. outer code is appended to the frame information to produce the frame. Proceed to block 460 to deliver the frame for transmission. Proceed to decision block 470. If there are more frames to process, return to block 410. If not, the process can stop.

Various alternatives and options can be added to the method of FIG. 4. For example, more than one section of the frame can be independently encoded with an inner code and included within the frame (details not shown). One benefit of encoding multiple sections independently is that an error in any one inner coded section would not preclude the other inner coded sections from being decoded correctly.

One example would be to encode the header with an inner code in addition to the inner code applied to any higher priority data such as signaling. Then, if an error occurs anywhere within the frame outside the header, the receiving device can still determine the type of frame that was sent. This may be useful when acknowledgements (ACK) messages, not acknowledge (NAK) messages, or retransmit request messages are sent according to a communication protocol. If the type of frame is known, it can be determined whether the frame contains information that must be retransmitted, or whether it contains data that can be erased. An example of frames that may be discarded if received in error would be certain frames used in lossy communication sessions such as voice, where a certain amount of error can be tolerated. Various retransmit protocol examples are detailed below.

Another option is to nest multiple inner coding applications. For example, within an inner coded segment could be nested a smaller portion that is also inner coded. This could be used when there are varying levels of priority in the data to be framed. Those of skill in the art will recognize the principles described herein apply to any combination of frame formats, data types, and retransmit protocols, and levels of inner coding.

Figure 5:
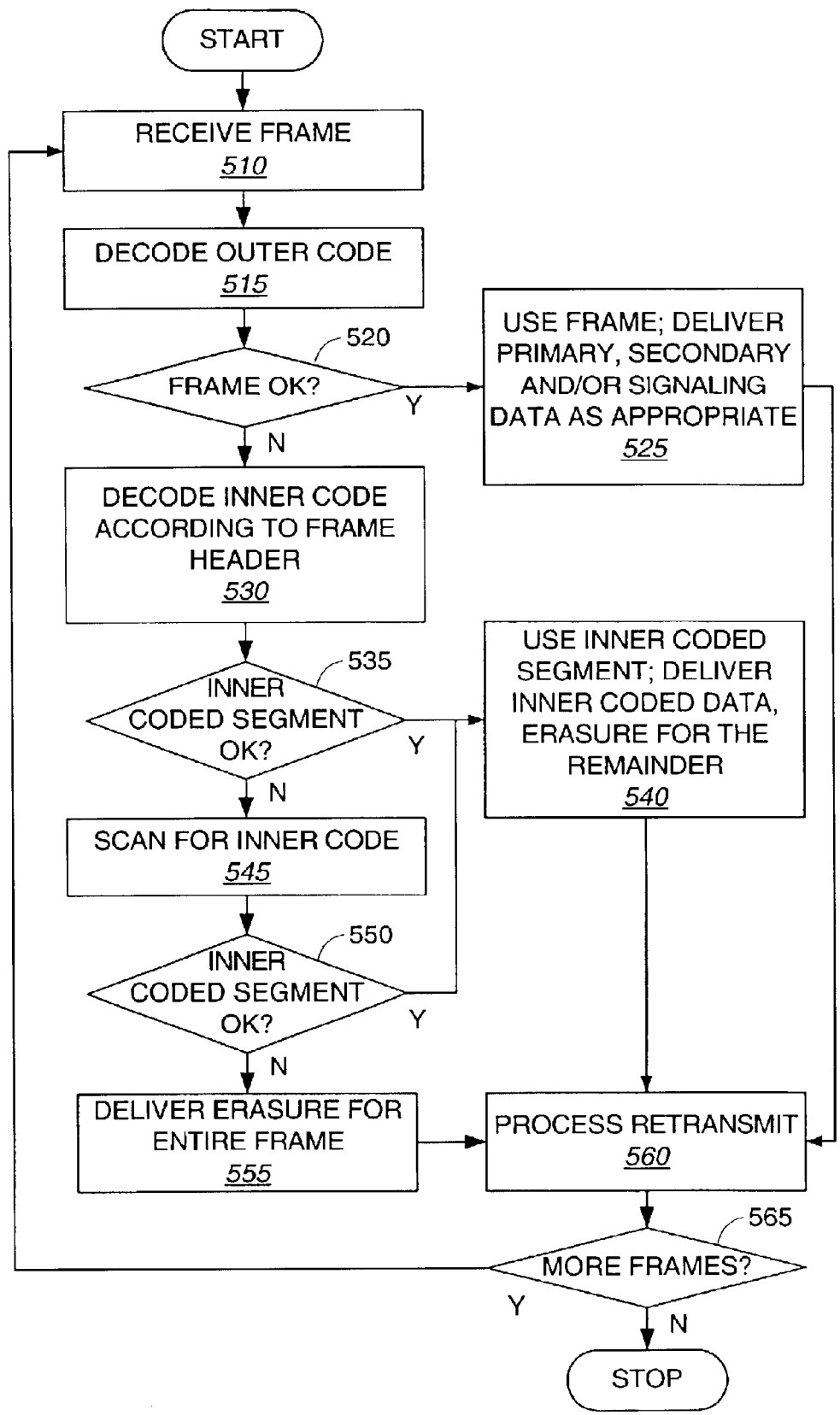
FIG. 5 depicts a flowchart of an exemplary embodiment of a method for receiving frames that may include inner coding.

FIG. 5 depicts an exemplary embodiment of a method for receiving frames that may include inner coding. The process begins in block 510, where a frame is received. Proceed to block 515 to decode the outer code. Proceed to decision block 520.

In decision block 520, if the frame is decoded correctly, proceed to block 525 to use the frame. The primary, secondary, and/or signaling data can be delivered to the proper destination. For example, the traffic may be delivered to higher layers for use in call maintenance, if signaling traffic was received, or to an application layer if application data (primary or secondary traffic) is received. The header will indicate which format is used. A frame format database 350 can be used in association with the header to determine which types of traffic and how many bits of those types are in the frame. The header may also indicate that the frame type includes one or more inner codes, as described with respect to FIG. 4 above. Since the outer code decoded properly in block 525, it may be fairly likely that any inner code data was also received correctly. In the exemplary embodiment, the inner code is not checked if the outer code is decoded correctly. Given the remote possibility of a false correct decoding, an alternate embodiment may proceed to check any inner codes as well (details not shown). Proceed to block 560 to process any retransmission requests that may be needed. In this case, no retransmission will be necessary, but other steps may need to be taken depending on the protocol being followed. An acknowledgement (ACK) may be transmitted, for example. Example retransmission protocols, which can be used in block 560, are detailed with respect to FIGS. 6–8, below.

Returning to decision block 520, if the outer code does not decode correctly, indicating an error in the received frame, proceed to block 530. In block 530, the header is used to determine if there are any inner coded segments. Those inner segments can then be tested with the inner code to determine if the inner coded segment or segments were received without error. Of course, it is possible that the header is the portion of the frame in which the error resides. In this case, it may be unlikely that a header error, and subsequent erroneous attempt to perform inner decoding, would be successful. In the exemplary embodiment, the header is assumed to be correct in block 530, for the purposes of looking for inner coded segments. In an alternative embodiment, the header can be encoded with its own inner code, as described above, with the appropriate code strength to achieve the desired probability of correct detection. In this case, the receiving station may have higher confidence in the header, if it decoded correctly, even if there is an error somewhere else in the frame. (Details of this alternative are not shown.) Proceed to decision block 535.

In decision block 535, if the inner coded segment indicated by the header does not decode correctly, or if there is no inner coded segment indicated, proceed to block 545. If the indicated inner code does decode correctly, it is likely that the inner coded segment was received without error. Those of skill in the art will know how to increase or decrease encoding strength to achieve the desired probability of correct detection (and by corollary to reduce the probability of false positive detection) to an acceptable level. Proceed to block 540.

In block 540, the inner coded segment is used. It can be delivered to the proper layer for further processing, as described above. An erasure can be delivered for the remainder of the frame, if that is desired. Proceed to block 560 to process any retransmission, as determined by the protocol in place, described above, and examples of which are detailed with respect to FIGS. 6–8, below.

Returning to block 545, which is arrived at when the outer frame encoding indicated an error, and no inner coding was indicated by the header, or the inner code indicated was not decoded properly. In this case, it is possible that the error was received in the header, and an inner coded segment may have been received without error. The possible locations of an inner coded segment, based on the frame types supported (perhaps indicated in a frame format database 350) can be determined. The frame can be scanned at these possible locations, and an attempt to decode the possible inner codes can be made. Proceed to decision block 550.

In decision block 550, if an inner coded segment was scanned and decoded correctly, proceed to block 540, and proceed as described above. In the exemplary embodiment, a scanned inner code, correctly decoded, is treated the same as an inner code identified by the header (with the assumption that the header may be in error. Note that, in this case, if the location of the scanned inner coded segment is associated with a unique frame type, then the header may be able to be corrected using the header information identifying the unique frame type. An alternative embodiment could then adjust the header with the updated information, and re-check the outer code. If the outer code decodes correctly, it may be likely that the frame can then be used in its entirety (details not shown). Blocks 545 and 550 can be omitted in an alternate embodiment, if the further processing to scan and locate possible segments is determined to be too burdensome. This alternative may be desirable when the likelihood of the event covered by these blocks is determined to be too low. If, in decision block 550, no inner coded segment is scanned and decoded correctly, proceed to block 555.

In block 555, an erasure can be delivered for the entire frame. Proceed to block 560, described above, to process any retransmission according to the protocol in place. Exemplary embodiments of retransmission processing, adaptable for use in block 560, are detailed with respect to FIGS. 6–8 below. Proceed to decision block 565. If the communication channel is continuing, and there are more frames to receive and process, proceed back to block 510 and repeat the process just described. If not, the process can stop.

Figure 6:
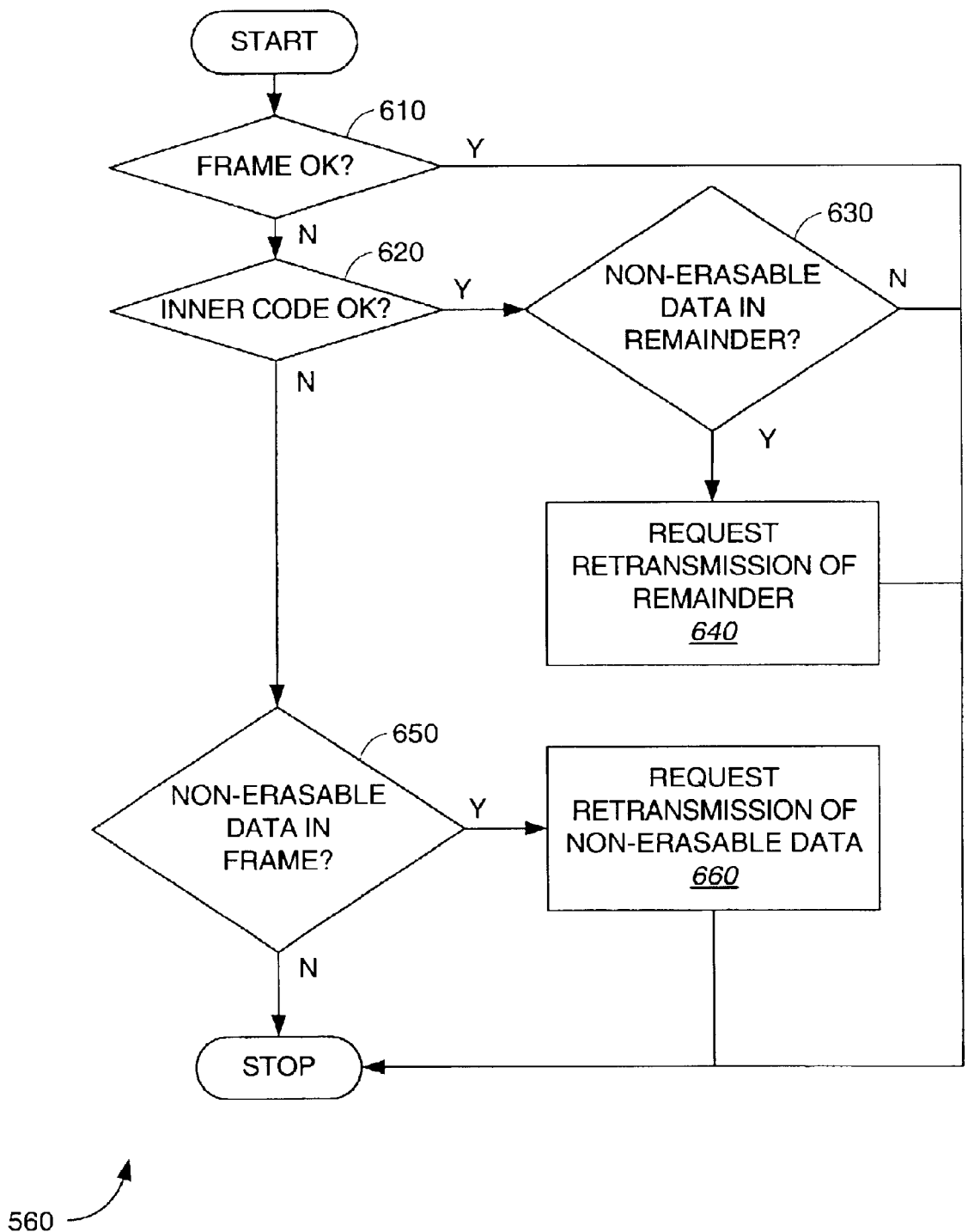
FIG. 6 depicts an exemplary embodiment of a retransmission process using retransmission requests.

FIG. 6 depicts an exemplary embodiment of a retransmission process, adaptable for use as block 560. This process can be used with a protocol that calls for the receiving station to request retransmission of frames received in error, under certain circumstances. The process starts in decision block 610. If the frame was decoded correctly, stop the process, essentially bypassing the process, since no retransmission is necessary. As discussed above, the process of FIG. 5 can be modified to avoid entering this process in this situation, in which case decision block 610 can be omitted. In this alternative, the retransmission process 560 would only be called when retransmission is necessary. The decision block is included for clarity of discussion, and because the flowchart of FIG. 5 is general enough to be compatible with all the exemplary embodiments discussed herein. As stated before, these retransmission processes are examples only. Those of skill in the art will readily adapt the principles disclosed herein to any type of retransmission process, all within the scope of the present invention. If the frame was not decoded correctly, proceed to decision block 620.

In decision block 620, if the inner code (or multiple inner codes, if more than one are included or nested) is decoded correctly, proceed to decision block 630. In decision block 630, if there is no non-erasable data in the remainder of the frame, then the mandatory data has been received correctly. No retransmission is necessary, the process can stop. If there is non-erasable data in the remainder, then an error has precluded that data from being received correctly. Proceed to block 640 and request retransmission of the remainder (or the portion of the remainder which is non-erasable). This assumes that the header is correct, thus correctly identifying the types of data in the frame, or other means exist in the receiving station such that this determination can be made. This may be applicable when the header is transmitted in such a way as to be more reliable, or an additional inner code on the header determined that it was received correctly. If an inner coded portion of the frame existed, and was decoded correctly, as indicated by the header, then the header was likely received correctly. If the inner coded segment was scanned, i.e. in block 545, then the assumption that the header is correct is probably not valid. As an alternative, to eliminate the need for assumption of a correct header, a Not Acknowledged (NAK) message for the remainder can be transmitted to the sending station instead, and the sending station can determine whether any of the remainder of the frame should be retransmitted. The sending station will know what type of data was included in the received frame. After any request for retransmission of the remainder or NAK is sent, the process can stop.

If, in decision block 620, no inner code was included or located, or the inner code decoded incorrectly, proceed to block 650. In decision block 650, similar to decision block 630, if there is no non-erasable data in the frame, then the frame does not need to be retransmitted, so the process can stop (assuming the header information is reliable). In the alternative, a NAK for the entire frame can be sent to the transmitting station and the transmitting station can determine if a retransmission is required based on the contents of the frame, about which it knows (details not shown). If there is non-erasable data in the frame (i.e. the header is reliable, or the receiving station has other means to determine the same), proceed to block 660. In block 660, request retransmission of the non-erasable data. Alternatively, a NAK for the entire frame can be sent and the transmitting station can determine whether or not to retransmit based on the frames contents, which it knows. Then the process stops.

Figure 7:
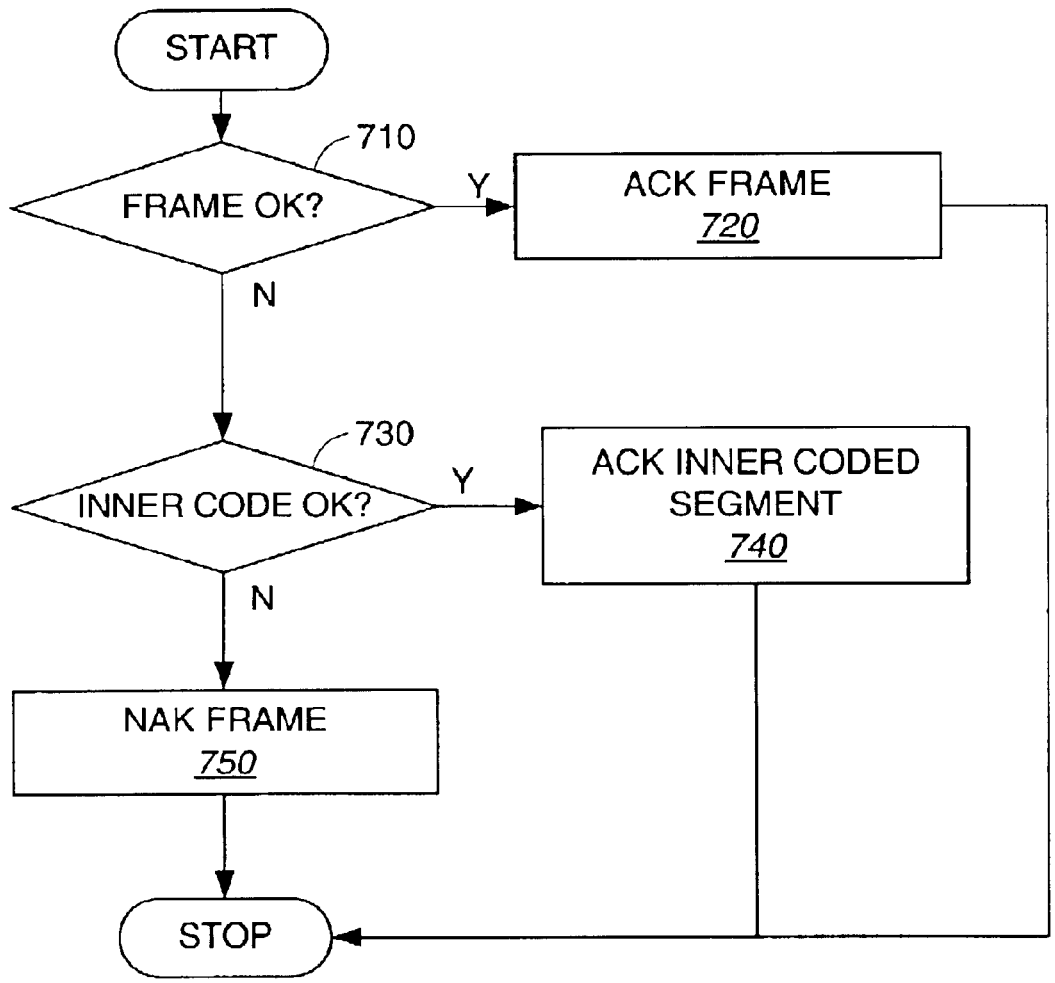
FIG. 7 depicts an exemplary embodiment of a retransmission process using positive acknowledgement.

FIG. 7 depicts another exemplary embodiment of a retransmission process, adaptable for use as block 560. This process can be used with a protocol that calls for the receiving station to acknowledge (by sending an ACK) the data received correctly. The process starts in decision block 710. If the frame was received correctly, proceed to block 720 and ACK the entire frame. Then the process stops.

If, in decision block 710, the frame was not decoded correctly, proceed to decision block 730. In decision block 730, if an inner coded segment is decoded correctly (or more than one inner coded segments are decoded correctly, as described above), proceed to block 740 and ACK the correctly received inner coded segment or segments. Then the process stops. If, in decision block 730, no inner coded segment was included or found, or the inner coded segment or segments decoded incorrectly, proceed to block 750 to NAK the entire frame. In an alternative, where only positive ACKs are transmitted, block 750 can be omitted and the receiving station can remain silent. The transmitting station will determine that no part of the frame was received correctly. Then the process stops. In all the cases described with respect to this FIG. 7, the transmitting station can determine whether or not any retransmission is necessary based on the contents of the transmitted frame, which it knows. Note that correct receiving of the header is not presumed in this process, except when the entire frame or a portion thereof is received and decoded correctly.

Figure 8:
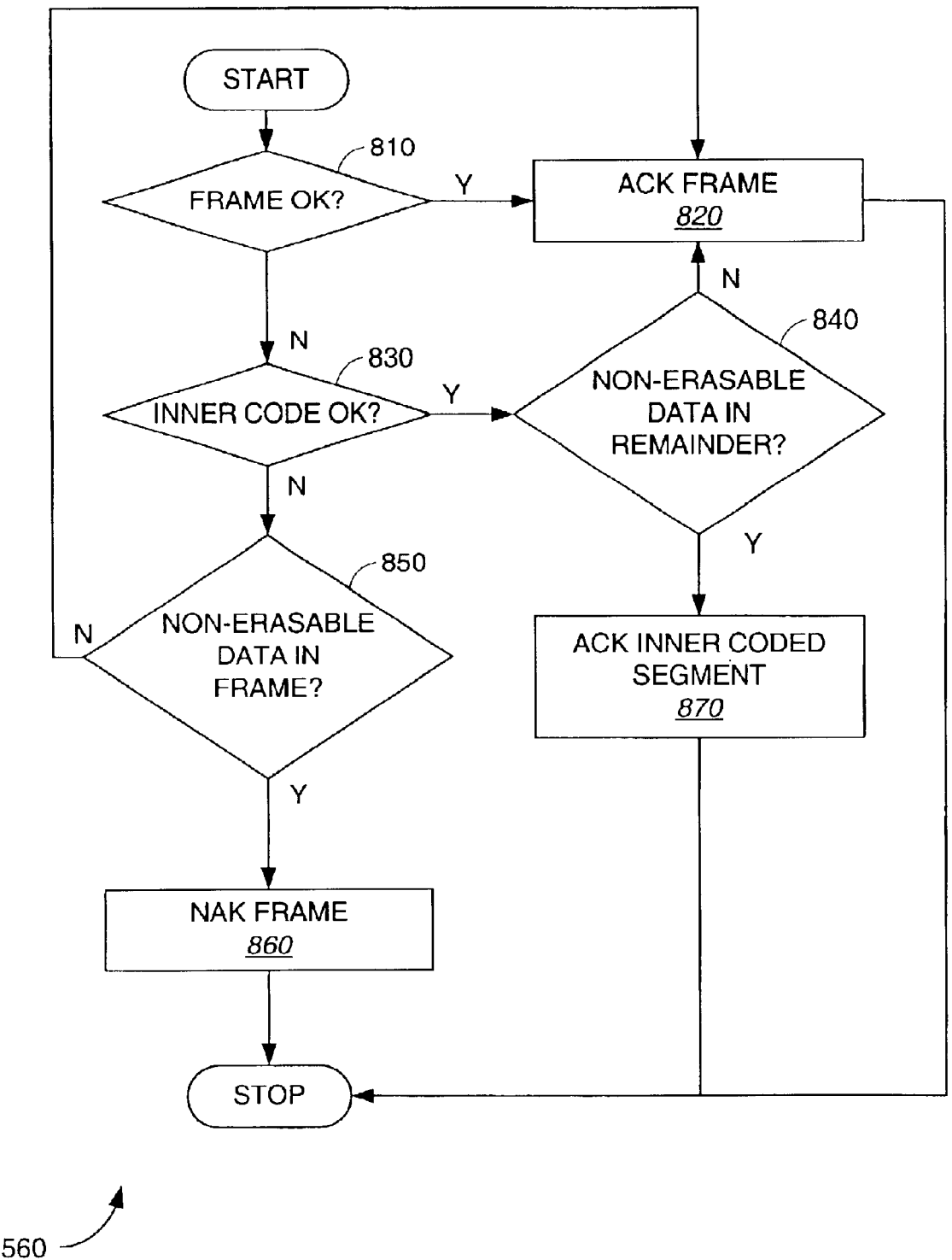
FIG. 8 depicts an exemplary embodiment of a retransmission process for use with reliable header information.

FIG. 8 depicts yet another exemplary embodiment of a retransmission process, adaptable for use as block 560. This process can be used when the received header information is reliable. This may be the case when the header is transmitted in such a way as to provide significant error protection, or when the header is encoded with an inner code and that inner code is decoded correctly. In addition, if any portion of the frame is encoded correctly, the header information is likely correct, or the correct header can be extrapolated from the correctly decoded segment or segments, as described above.

The process starts in decision block 810. If the frame was received correctly, proceed to block 820 and ACK the entire frame. In an alternative where the protocol requires NAKs only, otherwise correct reception is presumed, the receiving station can remain silent. No retransmission will be necessary. Then the process stops.

If, in decision block 810, the frame was not decoded correctly, proceed to decision block 830. In decision block 830, if one or more inner coded segments are decoded correctly, proceed to decision block 840. In decision block 840, if there is no non-erasable data in the remainder of the frame, proceed to block 820. The entire frame can be ACKed, or the receiver can remain silent in the alternative, as described above. No retransmission will be necessary in this case. On the other hand, if, in decision block 840, there is non-erasable data in the remainder, proceed to block 870. In block 870, the receiving station can ACK only the inner coded segment or segments that were correctly decoded. Alternatively, the non-erasable portion of the frame can be NAKed (or the entire remainder, allowing the transmitting station to determine which portion needs retransmission, based on the frame contents, which it knows).

As described above with respect to FIG. 6, if, for whatever reason, it is not desirable for the receiving station to perform the test, decision block 840 can be omitted. Instead, the remainder of the frame can be NAKed, or the correctly received segments can be ACKed, and the transmitting station can determine whether retransmission is required, based on the contents of the transmitted frame, which it knows.

Returning to decision block 830, if no inner coded segment was included or located, or located inner coded segments were not decoded correctly, proceed to decision block 850. In decision block 850, if there is no non-erasable data in the frame, proceed to block 820, described above. No retransmission is necessary in this case. If, in decision block 850, there is non-erasable data in the frame, proceed to block 860. The entire frame, or the non-erasable portions thereof, can be NAKed, allowing the transmitting station to determine whether any retransmission is required. In a protocol utilizing ACKs only, the receiving station can remain silent and the transmitting station will assume the frame was not received correctly and similarly determine whether any retransmission is required.

Again, if, for whatever reason, it is not desirable for the receiving station to perform the test, decision block 850 can be omitted. Instead, the remainder of the frame can be NAKed, and the transmitting station can determine whether retransmission is required, based on the contents of the transmitted frame, which it knows.

Table 4 shows example results of encoding the frame types and according to the code lengths shown in Table 3. The far right column shows the percentage of frames saved. In the example depicted in FIG. 4, the MuxPDU header is assumed to be correct so that the boundary of each section of the data in the frame is clearly indicated. The saved frames are computed as follows: saved frames=(Column4+Column 7)/Column 3+Column 7).

TABLE 4

Example Results

| Category | Bits used for PHY CRC (Outer Code) | Non-Signaling Bits (exclude the header) | Signaling Bits | Inner Code Bits | Outer Code Bits | Saved Frames (%) |
|---|---|---|---|---|---|---|
| Type 1 | | | | | | |
| 2 | 172 | 80 | 81 | 7 | 12 | 50 |
| 3 | 172 | 40 | 121 | 7 | 12 | 28.3 |
| 4 | 172 | 16 | 144 | 8 | 12 | 15.2 |
| 5 | 172 | 0 | 160 | 8 | 12 | N/A |
| Type 2 | | | | | | |
| 2 | 268 | 125 | 130 | 8 | 12 | 48.9 |
| 3 | 268 | 55 | 200 | 8 | 12 | 23.9 |
| 4 | 268 | 21 | 234 | 8 | 12 | 11.8 |
| 5 | 268 | 1 | 254 | 8 | 12 | N/A |
| 10 | 268 | 41 | 214 | 8 | 12 | 18.9 |
| 12 | 126 | 55 | 61 | 6 | 10 | 47.8 |
| 13 | 126 | 21 | 94 | 7 | 10 | 22.8 |
| 18 | 126 | 41 | 74 | 7 | 10 | 37.5 |
| 20 | 56 | 21 | 27 | 5 | 8 | 45.3 |

The embodiments described herein have the desired properties of reliably transmitting higher priority data and reducing the need for retransmission. As a result, as a result, system capacity and throughput can be increased, and time-sensitive signaling data can be received with reduced delay, increasing its effectiveness.

Note that the foregoing discussion has used the signals, codes and parameters defined in the 1× standard as some of the exemplary signals, codes and parameters. This is for clarity of discussion only, and should not be construed to limit the scope of the present invention to 1× systems. The principles of the present invention apply to any conceivable system in which higher priority data can be inner coded, as described above. Those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    an encoder for computing an outer code over a data frame and an inner code over a high priority segment of the data frame.

2. The apparatus of claim 1, further comprising a transmitter for transmitting the data frame.

3. The apparatus of claim 1, further comprising a receiver for receiving messages responding to the transmitted frame.

4. The apparatus of claim 3, wherein a message indicates valid reception of one or more of the segments of the transmitted frame.

5. The apparatus of claim 3, wherein a message indicates invalid reception of one or more of the segments of the transmitted frame.

6. An apparatus comprising:
    a decoder for decoding an outer code associated with the data frame and decoding the inner code of a high priority segment of the data frame when the outer decoding indicates the frame contains at least one error.

7. The apparatus of claim 6, further comprising a receiver for receiving the data frame.

8. The apparatus of claim 6, further comprising a transmitter for transmitting messages responding to the received frame.

9. The apparatus of claim 8, wherein a message indicates valid reception of one or more of the segments of the received frame.

10. The apparatus of claim 8, wherein a message indicates invalid reception of one or more of the segments of the received frame.

11. An apparatus comprising a frame processor for:
receiving data, segments of which are assigned one or more priority levels;
generating a header including one or more bits identifying an inner code of a segment of a frame;
encoding higher priority segments with one or more inner codes;
encoding the header, data and inner encoding with an outer code; and
producing the frame including the header, data, inner encoding, and outer encoding.

12. The apparatus of claim 11, further comprising a frame format database for storing a plurality of frame types and code parameters and header information associated therewith, the frame format database accessible by the frame processor for use in encoding and header generation.

13. The apparatus of claim 11, wherein the received data comprises one or more segments of primary traffic, secondary traffic, or signaling traffic.

14. The apparatus of claim 11, wherein the frame processor further encodes the header with an inner code.

15. An apparatus comprising a frame processor for:
identifying a header for an inner code of a segment of a received frame;
decoding an outer code of the received frame to detect one or more errors within the frame; and
decoding the inner code of the segment of the frame when the outer decoding detected one or more errors in the frame.

16. The apparatus of claim 15, further comprising a frame format database for storing a plurality of frame types and code parameters and header information associated therewith, the frame format database accessible by the frame processor for use in locating and decoding inner coded segments.

17. A wireless communication device comprising:
an encoder for computing an outer code over a data frame and an inner code over a high priority segment of the data frame.

18. A wireless communication device comprising:
a decoder for decoding an outer code associated with the data frame and decoding the inner code of a high priority segment of the data frame when the outer decoding indicates the frame contains at least one error.

19. A method of preparing a data frame for transmission, segments of which are assigned one or more priority levels, comprising:
determining a frame type in accordance with the one or more priority levels of the segments in the frame;
performing inner coding on segments assigned a higher priority level, when the frame comprises segments of more than one priority level;
performing outer coding on the data, inner coding, and header associated with the frame type; and
forming a frame comprising the header, data, inner coding, and outer coding.

20. The method of claim 19, further comprising accessing a frame format database to retrieve a frame type and coding parameters.

21. The method of claim 19, further comprising inner coding the header, the results of which are included in the outer coding.

22. A method of processing a received data frame, comprising:
generating a header for identifying an inner code of a segment of the frame;
decoding the outer code of the frame to detect one or more errors in the frame; and
decoding the inner code of segment of the frame when the outer decoding detected one or more errors in the frame.

23. The method of claim 22, further comprising delivering all the data segments of the frame when the outer decoding decodes without error.

24. The method of claim 22, further comprising delivering a segment of the frame when the inner decoding decodes without error.

25. The method of claim 22, further comprising determining the location and duration of inner coded data according to a frame header.

26. The method of claim 25, wherein determining the location and duration of inner coded data comprises accessing a frame format database.

27. The method of claim 22, further comprising scanning for all possible inner coded segments when the outer decoding detects one or more errors and the inner decoding of the segment identified by the header decodes with one or more errors.

28. The method of claim 27, further comprising:
identifying header information corresponding to a located inner coded segment;
replacing the header information in the frame with the identified header information; and
reattempting to decode the outer code using the frame with the replaced header information.

29. The method of claim 22, further comprising decoding more than one inner coded segment.

30. The method of claim 22, further comprising decoding an inner code applied to the header.

31. The method of claim 22, further comprising requesting retransmission of the remainder of the frame when the inner decoding of one or more segments decodes without error.

32. The method of claim 22, further comprising sending to the transmitting station an acknowledgment indicating reception of one or more inner coded segments when the decoding of the one or more segments decodes without error.

33. The method of claim 22, further comprising sending to the transmitting station an acknowledgment indicating reception of the entire frame when the decoding of the one or more segments decodes without error and the remainder of the frame is erasable data.

34. The method of claim 22, further comprising sending to the transmitting station an acknowledgment indicating failed reception of the remainder of the frame when the decoding of one or more inner coded segments decodes without error.

35. The method of claim 22, further comprising sending to the transmitting station an acknowledgment indicating failed reception of the entire frame when the decoding of one or more inner coded segments decodes with one or more errors.

36. An apparatus, operable with a data frame, segments of which are assigned one or more priority levels, comprising:
means for determining a frame type in accordance with the one or more priority levels of the segments in the frame;

means for performing inner coding on segments assigned a higher priority level, when the frame comprises segments of more than one priority level;

means for performing outer coding on the data, inner coding, and header associated with the frame type; and means for forming a frame comprising the header, data, inner coding, and outer coding.

37. An apparatus, comprising:

means for identifying an inner code of a segment of a received frame;

means for decoding an outer code of the received frame to detect one or more errors in the frame; and means for decoding the inner code of a segment of the frame when the outer decoding detected one or more errors in the frame.

38. The apparatus of claim 37, further comprising means for determining the location and duration of inner coded data according to a frame header.

39. A wireless communication system, comprising:

means for determining a frame type in accordance with the one or more priority levels of the segments in the frame;

means for performing inner coding on segments assigned a higher priority level, when the frame comprises segments of more than one priority level;

means for performing outer coding on the data, inner coding, and header associated with the frame type; and means for forming a frame comprising the header, data, inner coding, and outer coding.

40. A wireless communication system, comprising:

means for identifying an inner code of a segment of a received frame;

means for decoding an outer code of the received frame to detect one or more errors in the frame; and means for decoding the inner code of the segment of the frame when the outer decoding detected one or more errors in the frame.

41. Processor readable media operable to perform the following steps:

determining a frame type in accordance with the one or more priority levels of the segments in the frame;

performing inner coding on segments assigned a higher priority level, when the frame comprises segments of more than one priority level;

performing outer coding on the data, inner coding, and header associated with the frame type; and forming a frame comprising the header, data, inner coding, and outer coding.

42. Processor readable media operable to perform the following steps:

identifying an inner code of a segment of a frame;

decoding an outer code of the frame to detect one or more errors in the frame; and decoding the inner code of segment of the frame when the outer decoding detected one or more errors in the frame.

* * * * *